United States Patent [19]

Jenkins et al.

[11] 4,088,360

[45] May 9, 1978

[54] KITCHEN UTENSIL

[76] Inventors: Charmaine A. Jenkins; Garry W. Jenkins, both of P.O. Box 635, Burlington, Vt. 05401

[21] Appl. No.: 682,321

[22] Filed: May 3, 1976

[51] Int. Cl.² .................. A47J 43/28; A23N 15/00
[52] U.S. Cl. .............................................. 294/8; 99/644
[58] Field of Search .................... 99/644; 30/356; 294/7-8, 49

[56] References Cited

U.S. PATENT DOCUMENTS 2,567,091 9/1951 Whitnah .................................. 294/7

FOREIGN PATENT DOCUMENTS 106,631 3/1939 Australia .................................. 294/7

Primary Examiner—Harvey C. Hornsby
Assistant Examiner—Robert Pous

[57] ABSTRACT

A culinary article for turning over foods such as eggs, without flipping them, has a spatula section to pick up the food, a curved surface over which the food next slides to partially turn it over, an opposing, coacting curved surface which receives the food and completes the reversal action as the food slides therealong, and a delivery surface.

6 Claims, 8 Drawing Figures

U.S. Patent    May 9, 1978    4,088,360
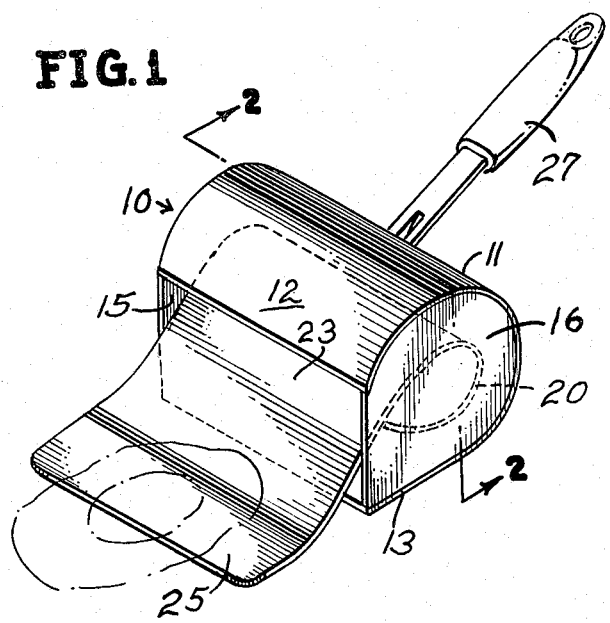
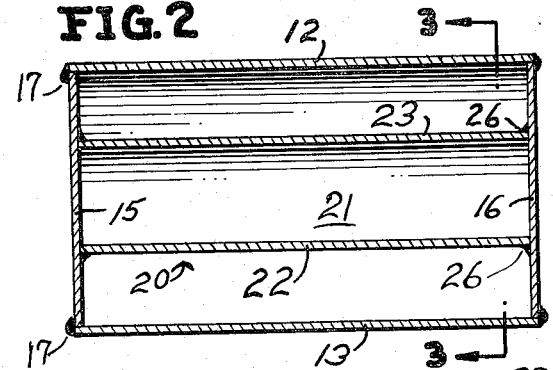
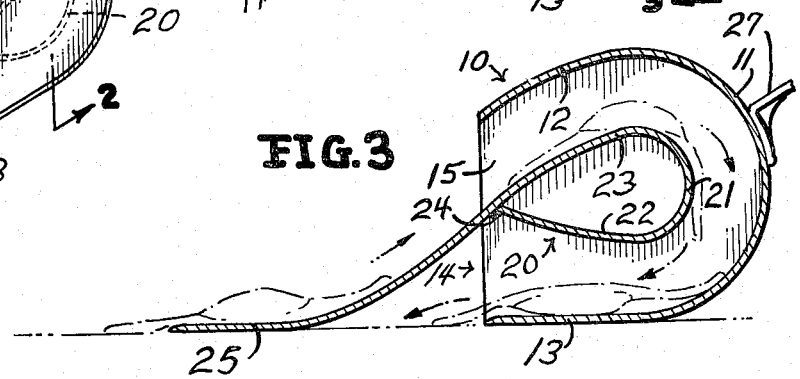
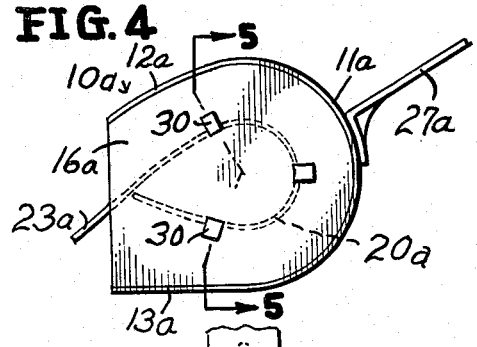
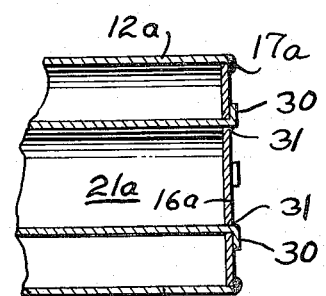
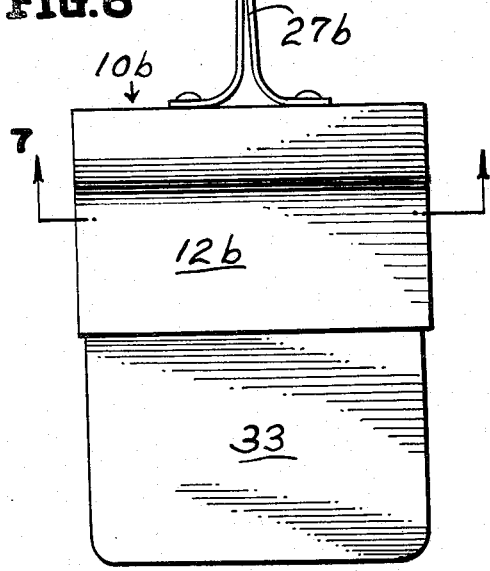
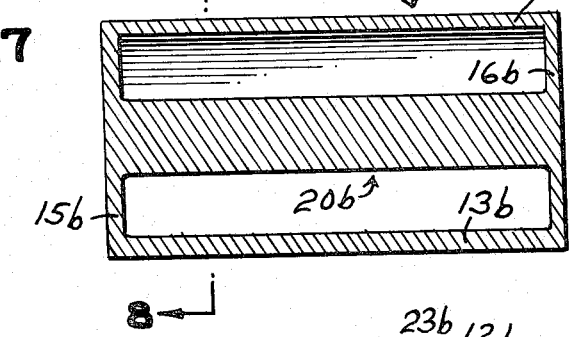
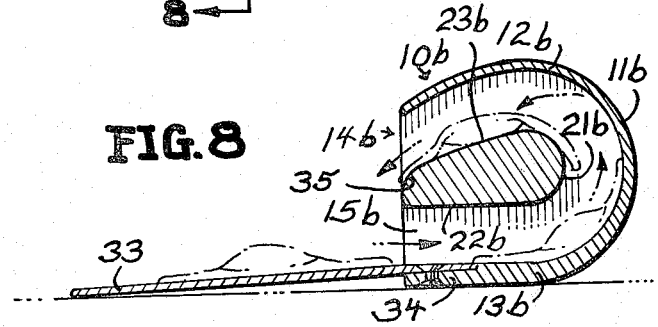

KITCHEN UTENSIL

This invention relates to kitchen utensils and particularly to an article or culinary tool for turning foods upside down without actually flipping them over in the usual manner.

A specific example, but the invention is not limited thereto, of a food which is frequently turned upside down to cook it is an egg being fried. The contents of the egg shell are deposited on a hot plate or skillet or in a frying pan. After a cooking interval a spatula is inserted under the egg to lift it up and, with a quick wrist motion, it is flipped or thrown over on the same cooking surface and frying of the formerly top side is initiated. In turning the egg over there is a period that it is in mid-air as the egg is neither on the spatula or the cooking surface.

As the egg yolk is quite fragile it frequently is broken when the egg is flipped over, or the egg does not land where it should and some of it falls outside of the skillet or pan. If an effort is made to slowly turn the egg over to avoid these mishaps, the egg frequently folds onto itself and it looses its desired spreadout appearance and it does not become uniformly and properly cooked.

This problem has been recognized in the past and utensils have been devised to solve it but they have not been satisfactory. For instance, U.S. Pat. No. 2,567,091 to Whitnah shows an inside U-shaped utensil but the egg has to be quickly flipped from one surface to the other to turn it over. U.S. Pat. No. b 3,758,143 to Godlewski shows a two bladed spatula to turn eggs over but the same quick wrist flipping motion is required. With both of these prior art devices the egg is quite likely to have its yolk broken or the egg becomes at least partially folded upon itself or some of the egg misses the other surface of the utensil as it is being thrown over.

The utensil of the present invention eliminates the disadvantages experienced in flipping an egg over with an ordinary spatula and it overcomes the similar defects of prior articles for assisting in turning an egg over. The article of the present invention provides opposing surfaces over which the egg slides and becomes automatically, in a sense, turned over. The egg slips progressively from one surface to the opposing, cooperating surface and in the course of doing so the initial top side of the egg becomes the bottom side. As will be explained, these opposing, cooperating surfaces are internal surfaces which are more or less semi-cylindrical in formation.

The invention will be clarified by reference to the accompanying drawings in which:

FIG. 1 is a perspective of a preferred embodiment of the invention showing, in construction lines, an egg just being picked up, FIG. 2 is a sectional view on the line 2—2 of FIG. 1, FIG. 3 is a sectional view on the line 3—3 of FIG. 2, showing the progressive movement of an egg in the course of being turned over as it slides from one internal surface to the other, FIG. 4 is an end elevational view of an alternate manner of assembling the utensil, FIG. 5 is a sectional view on the line 5—5 of FIG. 4, FIG. 6 is a plan view of a modification of the utensil to show a casting construction and a generally reversed use, FIG. 7 is a sectional view on the line 7—7 of FIG. 6, and FIG. 8 is a sectional view on the line 8—8 of FIG. 7.

Referring first to the preferred embodiment of FIGS. 1, 2 and 3, the utensil includes an outer shell 10 which, at its rearward portion as is shown in FIG. 3, is generally semi-circular in cross section, as indicated at 11. From this curved portion 11 the shell continues forward with the upper tangential portion 12 and the lower tangential portion 13, to provide a relatively high open front 14. This shell 10 can be made of sheet metal such as aluminum or brass so that it can easily be soldered. The lower tangential portion of the shell is preferably flat to lie against the cooking surface. The upper tangential portion 12 may have the slight curvature shown but it is principally for artistic purposes as it plays a minimal part in turning the egg over and in fact the portion 12 can be shortened or eliminated.

To enclose the ends of the shell 10, the end plates 15 and 16 are provided and the periphery of each conforms to the cross-sectional shape of the shell 10. These end plates or walls 15 and 16 are attached to the shell by solder as is indicated at 17, as is shown in FIG. 2.

Within the enclosure formed by the outer shell 10 and the end plates 15 and 16 is a sheet metal element 20 which at its rearward portion 21 is semi-circular in cross section and is equidistant from the outer curved portion 11. Extending forwardly from the curved portion 21 at its lower end is a substantially tangential portion 22 and there is a similar upper tangential portion 23 which slopes downwardly and forwardly as is shown in FIG. 3. These two tangential portions 22 and 23 meet at a peak 24 which is more or less at the front opening 14. Solder may be applied at this peak to seal the interior of the inner element 20.

The downwardly and forwardly sloping portion 23 continues beyond the front opening 14 and gradually curves into a spatula like section 25 which is intended to scoop up the egg. It will be noted that the spatula like section 25 is in the same plane as the lower portion 13 of the outer shell 10 so that they will lie flat against the cooking surface. The side edges of the inner element fit against the end plates 15 and 16 and are soldered thereto as shown at 26. In the assembly, the end plates should first be soldered to the inner element at 26 and then the outer shell 10 should be slipped over the end plates and solder should be applied at 17.

A handle 27 is secured to the outer shell 10, at a location and at an angle which will best fit the user, and it may be soldered in place. The handle can as well be secured to one of the end plates 15 or 16 as some persons may prefer to use the utensil by scooping an egg up on the spatula part 25 with a sidewise motion instead of with a forward motion. The selection of the plate 15 or 16 for the location of the handle may be best for a left or right handed person.

The manner in which an egg is turned by the utensil is shown by the progressive arrows in FIG. 3 and the successive positions of the egg. The egg is scooped up by the spatula section 25 and by lowering the handle and giving a slight forward motion the egg slides along the upper portion 23. A continued rearward movement of the egg causes it to gradually move around the curved portion 21 and to advance onto the surface of the lower tangential portion 13 of the outer shell. As these cooperating surfaces are not much further apart than the thickness of the egg, the transfer is an easy and a gentle one in the course of which the egg is turned over.

The egg then moves forwardly along the lower portion 13 and out of the utensil and onto the cooking surface. In accomplishing this entire turn-over of the egg, only the surfaces on which the egg is shown in FIG. 3 are used if some care is taken in manipulating the utensil and the remaining opposing surfaces which form the internal passageway serve to keep the egg in place if the handling is too active. The essential coacting or cooperating internal surfaces are shown with the egg on them as stated above.

FIGS. 4 and 5 show an alternate way of assembling the utensil. Tabs 30 are formed at the edges of the inner sheet element 20 and they are inserted through properly located holes in the end plates 15 and 16. These holes are indicated at 31 and after the tabs are pushed through them they are bent over so as to firmly hold the end plates against the inner element. Then the outer shell 10 is slid in place and fastened by soldering. In FIGS. 4 and 5 the corresponding parts are given the subscript *a* with reference to FIGS. 1 to 3.

FIGS. 6, 7 and 8 are selfexplanatory with the additional information that the utensil is mostly a precasting rather than an assembly of several parts. This casting can be of aluminum or of a heat resistant plastic, for instance. Another difference is that the spatula plate 33 is attached to the bottom wall 34 which corresponds to the lower tangential portion 13 in FIG. 3. The egg is picked up on this spatula plate 33 and is moved around the interior passageway as is shown by the directional arrows and the successive locations of the egg. The manner in which the egg is turned over is clear. The spatula plate 33 could, of course, be secured to the forward upper surface of the internal section at the point 35 so that it is located as in FIG. 3. Likewise, the spatula section 25 could be a forward extension of the lower tangential portion 13 in FIG. 3 so that the egg slides around the interior of FIG. 3 in a reverse course. Parts in FIGS. 6 to 8 which correspond to FIGS. 1 to 3 are given the subscript *b*.

The utensil can be used to turn other foods such as hambergs and pan-cakes upside down with the same progressive sliding action.

We claim:

1. A kitchen utensil for turning food over by a sliding action instead of a flipping action, which comprises an outer shell having a concave inner surface, separate therefrom an inner element having a convex outer surface at least a part of which opposes and is spaced from at least a part of said concave surface so as to form between them a passageway curved through an angle of at least 180° through which the food advances, and a spatula section adjacent one end of said passageway for picking up the food and directing it to one of said surfaces so that as the food slides over that surface and is transferred across said passageway to the other surface the food is turned over.

2. The kitchen utensil of claim 1 in which said passageway is generally a portion of a cylinder.

3. The kitchen utensil of claim 1 in which said inner element is a shell.

4. The kitchen utensil of claim 1 in which said inner element is a core.

5. The kitchen utensil of claim 1 in which the spatula section is an extension of the outer shell.

6. The kitchen utensil of claim 1 in which the spatula section is an extension of the inner element.

* * * * *